United States Patent
Murakami

(10) Patent No.: US 8,422,144 B2
(45) Date of Patent: Apr. 16, 2013

(54) IMAGING APPARATUS

(75) Inventor: Taro Murakami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 33 days.

(21) Appl. No.: 13/210,641

(22) Filed: Aug. 16, 2011

(65) Prior Publication Data

US 2012/0044582 A1   Feb. 23, 2012

(30) Foreign Application Priority Data

Aug. 18, 2010   (JP) .................................. 2010-183296

(51) Int. Cl.
G02B 15/14   (2006.01)
G02B 7/02   (2006.01)

(52) U.S. Cl.
USPC ............................. 359/704; 359/819; 359/822

(58) Field of Classification Search .......... 359/694–704, 359/811–830; 348/335, 374
See application file for complete search history.

(56) References Cited

U.S. PATENT DOCUMENTS 6,122,116 A * 9/2000 Uno ............................... 359/826
7,920,336 B2 * 4/2011 Murakami ..................... 359/704

FOREIGN PATENT DOCUMENTS

JP   2007-212630 A   8/2007
JP   2009-122640 A   6/2009

OTHER PUBLICATIONS

U.S. Appl. No. 13/210,582, filed Aug. 16, 2011, Shuichi Terada.
U.S. Appl. No. 13/210,596, filed Aug. 16, 2011, Shuichi Terada.
U.S. Appl. No. 13/210,610, filed Aug. 16, 2011, Shuichi Terada.

* cited by examiner

Primary Examiner — Mohammed Hasan
(74) Attorney, Agent, or Firm — Canon USA Inc IP Division

(57) ABSTRACT

A lens barrel holding frame whose back surface wall is positioned at a position on the reflection optical element, in a state before moving to the retraction position, opposite to the lens unit in a direction of the first optical axis, wherein a through hole, through which the lens unit can retract along the first optical axis, is formed on the back surface wall of the lens barrel holding frame.

2 Claims, 16 Drawing Sheets

IMAGING APPARATUS

BACKGROUND OF THE INVENTION

1. Field of the Invention

The present invention relates to an imaging apparatus, such as a silver-halide film camera, a digital camera, and a digital video camera, which includes a zoom type lens barrel configured to change a shooting magnification by moving between a storage position and a shooting position along an optical axis.

2. Description of the Related Art

As a type of an imaging apparatus including a zoom type lens barrel, such as a digital camera, Japanese Patent Application Laid-Open No. 2007-212630 discusses an imaging apparatus including a reflection optical element, such as a prism, which guides light flux incident thereto from a plurality of lens units into an image sensor by bending the light flux in a direction intersecting with an optical axis to achieve a small size lens barrel.

In the zoom lens discussed in Japanese Patent Application Laid-Open No. 2007-212630, a light flux incident from a first lens unit is bent in a direction substantially perpendicular to a light-incident optical axis by using a reflection optical element, such as a prism, which is provided to the rear of the first lens unit of a lens barrel. In this manner, the conventional method forms an image on the image sensor. In addition, in the above-described conventional method, a through hole, through which a holding member configured to hold a prism can enter and exit between a position rear to the first lens unit and a retraction position close to the image sensor, is formed on a fixed barrel.

Even if the size of the first lens unit arranged on the light flux-incident optical axis is large, it is desired by the market to provide a camera having a thin body by reducing the dimension of the camera in the direction of the light-incidence optical axis in a lens barrel retracted state.

However, in the method discussed in Japanese Patent Application Laid-Open No. 2007-212630, in retracting the first lens unit along a light-incident optical axis, the first lens unit can be retracted only up to a position at which the first lens unit does not interfere with a cover on a back surface of a lens barrel holding frame. Accordingly, if a large-size first lens unit is used, a space into which the first lens unit is to be retracted may be limited. Therefore, the above-described conventional method can reduce the thickness of the camera body by only a limited amount.

SUMMARY OF THE INVENTION

The present invention is directed to an imaging apparatus whose thickness in a lens barrel retracted state can be reduced more by providing a large space for retracting a lens unit arranged along a light-incident optical axis.

According to an aspect of the present invention, an imaging apparatus including a zoom type lens barrel configured to change a shooting magnification by moving between a storage position and a shooting position in a direction of an optical axis includes a lens unit arranged to be movable along a first optical axis, a reflection optical element configured to move along a second optical axis, which extends in a direction intersecting with the first optical axis, configured, when the lens unit moves to the shooting position along the first optical axis, to bend a light flux incident from the lens unit in a direction of the second optical axis to guide the incident light flux onto an image plane, and configured, when the lens unit moves to the storage position along the first optical axis, to form a storage space for storing the lens unit by moving to a retraction position along the second optical axis, an optical system arranged between the reflection optical element and the image plane, and a lens barrel holding frame whose back surface wall is positioned at a position on the reflection optical element, in a state before moving to the retraction position, opposite to the lens unit in a direction of the first optical axis, wherein a through hole, through which the lens unit can retract along the first optical axis, is formed on the back surface wall of the lens barrel holding frame.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the invention.

DESCRIPTION OF THE EMBODIMENTS

Various exemplary embodiments, features, and aspects of the invention will be described in detail below with reference to the drawings.

Figure 1:
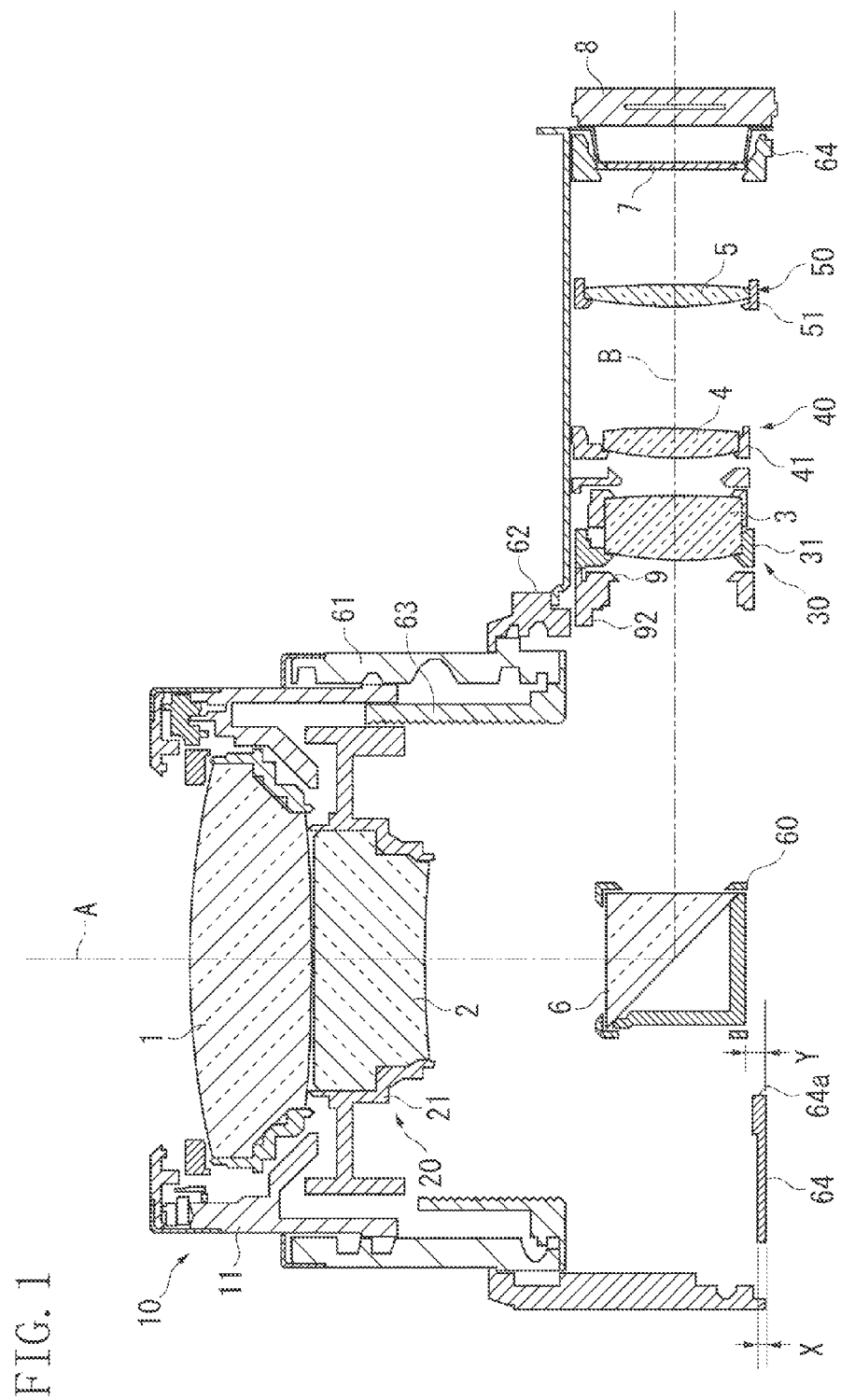
FIG. 1 is a cross section of main components of a digital camera, which is an exemplary embodiment of an imaging apparatus of the present invention, in which a lens barrel of the digital camera is positioned at a wide-angle end.
Figure 2:
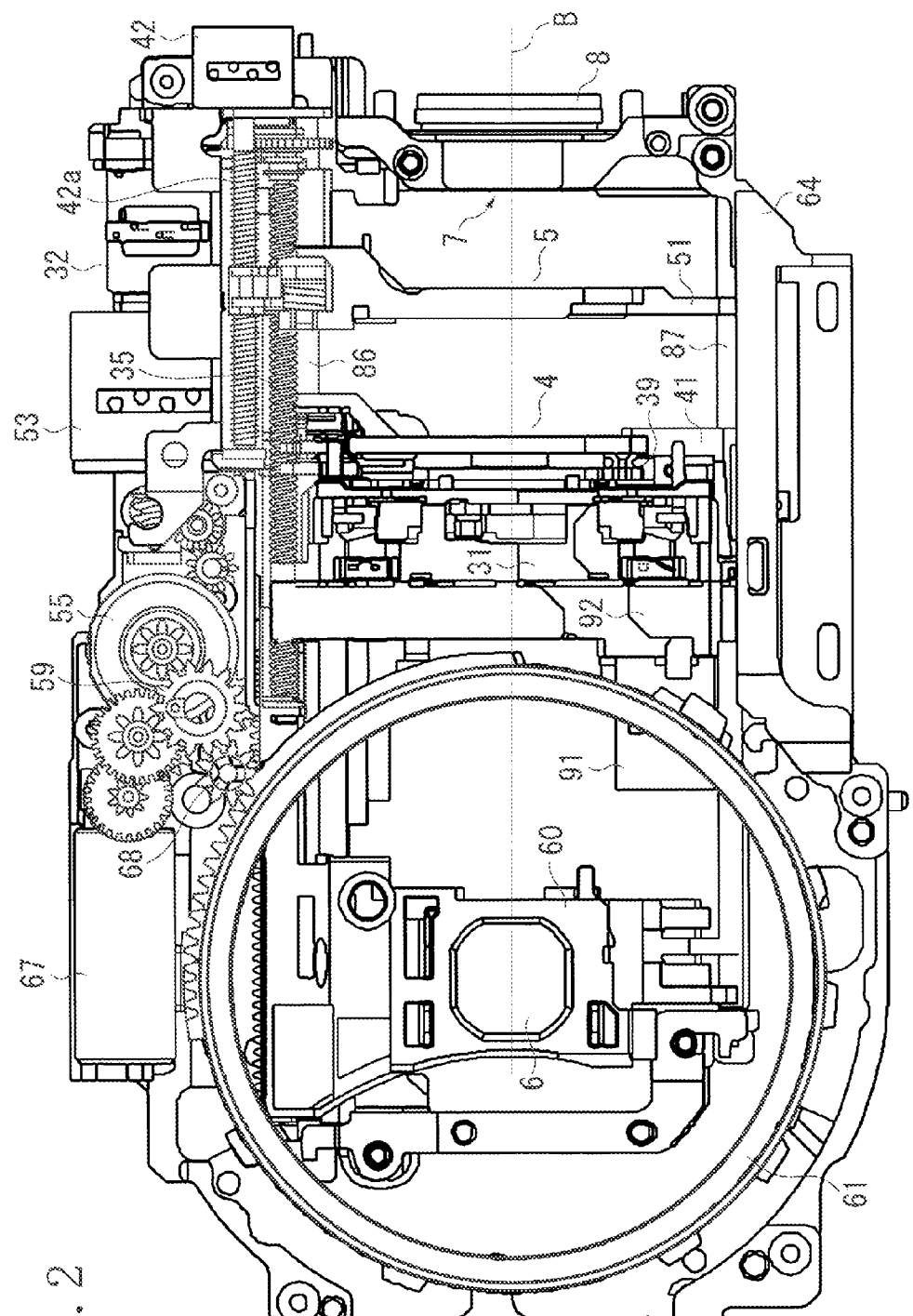
FIG. 2 is a front view of main components of the digital camera illustrated in FIG. 1, when viewed from an object side of a first lens unit.

FIG. 1 is a cross section of main components of a digital camera, which is an exemplary embodiment of an imaging apparatus of the present invention, in which a lens barrel of the digital camera is positioned at a wide-angle end. FIG. 2 is a front view of the main components of the digital camera illustrated in FIG. 1, when viewed from an object side of a first lens unit. In the present exemplary embodiment, it is supposed that the lens barrel is a zoom type lens barrel configured to move between a storage position and a shooting position along an optical axis to change a shooting magnification.

Referring to FIGS. 1 and 2, a digital camera according to the present exemplary embodiment includes a zoom type lens barrel, which is constituted by a first lens unit 10, a second lens unit 20, a prism 6, a fixed barrel 62, a cam barrel 61, and an advancement guide barrel 63. In addition, the digital camera according to the present exemplary embodiment includes a zoom body 64, which is an example of a lens barrel holding frame of the present invention. In the example illustrated in FIG. 2, the first lens unit 10, the second lens unit 20, the fixed barrel 62, and the advancement guide barrel 63 are not illustrated.

The first lens unit 10 includes a first-unit lens 1, which is held by a first lens unit barrel 11. The second lens unit 20, includes a second-unit lens 2, which is held by a second-unit lens barrel 21. Light fluxes of light incident from the first-unit lens 1 and the second-unit lens 2 are bent by the prism 6 in a direction of the optical axis B, which intersects the optical axis A of the first-unit lens 1 and the second-unit lens 2 with an angle of approximately 90° and are then guided to an image plane of an image sensor 8.

The prism 6 is held by a holding member 60 and can move along the optical axis B. The optical axis A corresponds to a first optical axis of the present invention. The optical axis B implements a second optical axis of the present invention.

A diaphragm-shutter 9, which is configured to control the light amount during shooting, a third-unit lens 3, a fourth-unit lens 4, a fifth-unit lens 5, and an optical filter 7 are arranged along the optical axis B between the prism 6 and the image sensor 8, in order from the prism 6 to the image sensor 8. The third-unit lens 3, the fourth-unit lens 4, and the fifth-unit lens 5 each correspond to an optical member of the present invention.

The diaphragm-shutter 9 is fixed to a shutter ground plate 92. The third-unit lens 3 is held by a third unit-ground plate 31. The third unit-ground plate 31 and the shutter ground plate 92, which are integrated together by using a screw, constitute a third lens unit 30. Changing of magnification is performed by the third lens unit 30 by moving along the optical axis B. The third lens unit 30 is driven by a stepping motor 32.

Figure 3:
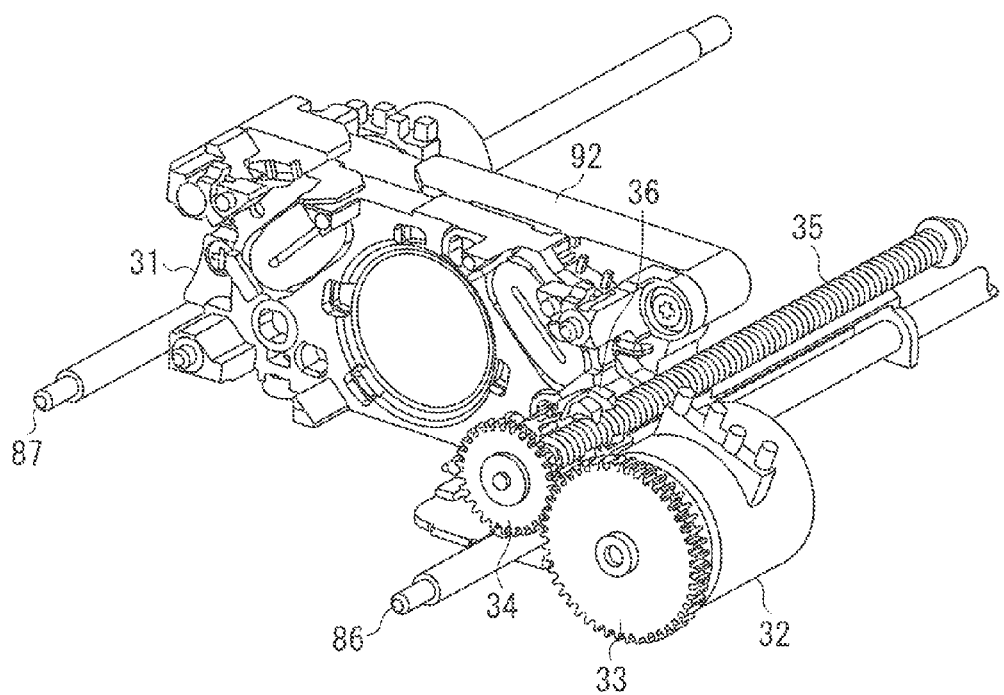
FIG. 3 is a perspective view illustrating an example mechanism for driving a third lens unit.

FIG. 3 is a perspective view illustrating a drive mechanism for the third lens unit 30. Referring to FIG. 3, a gear 33 is attached to an output axis of the stepping motor 32. The gear 33 engages a gear 34 to rotate a screw 35 with an increased speed.

A rack 36, which is attached to the third unit-ground plate 31, engages the screw 35. In addition, the third unit-ground plate 31 is supported and held by guide shafts 86 and 87. The guide shafts 86 and 87 are arranged in parallel to the optical axis B. With the above-described configuration, the third unit-ground plate 31 can move along the optical axis B. Furthermore, with the above-described configuration, the rack 36 is subjected to a force in the direction of the optical axis B as the screw 35 rotates. Moreover, the third lens unit 30 moves in the direction of the optical axis B together with the rack 36.

Figure 4:
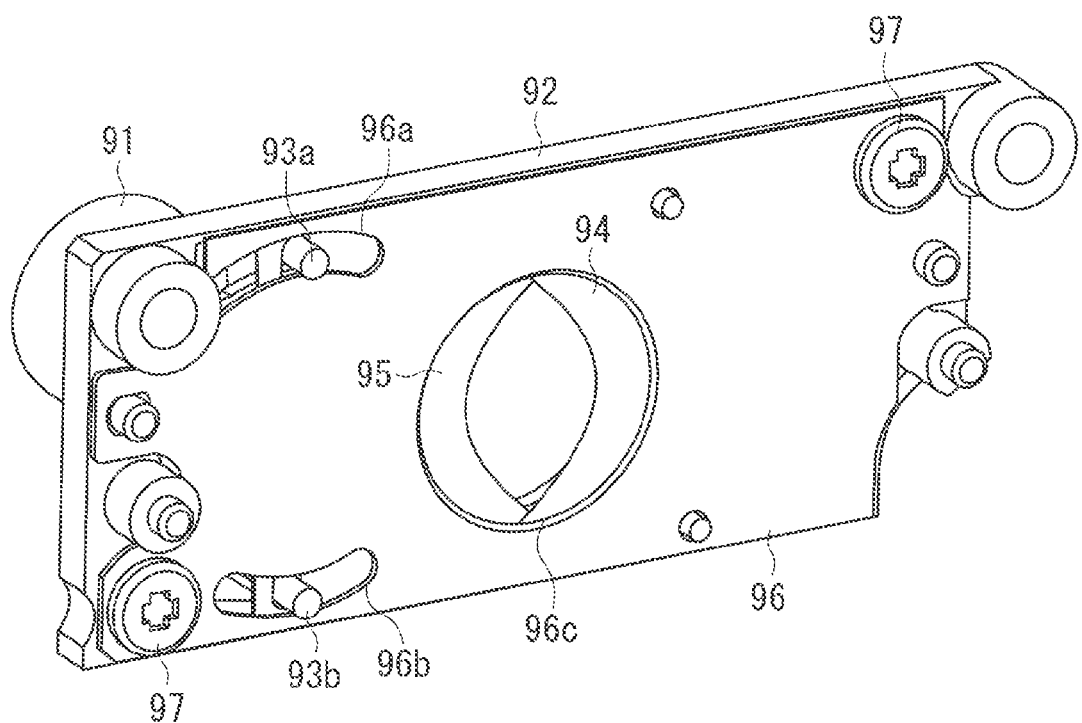
FIG. 4 is a perspective view of a diaphragm-shutter.
Figure 5:
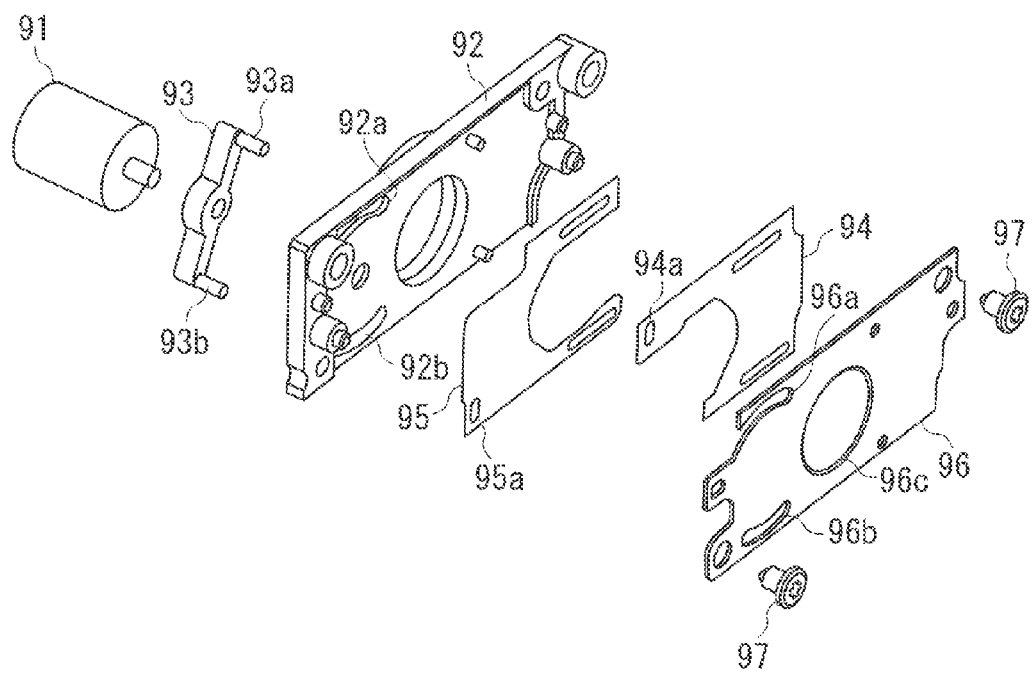
FIG. 5 is a perspective exploded perspective view of the diaphragm-shutter.

FIG. 4 is a perspective view of the diaphragm-shutter 9. FIG. 5 is an exploded perspective view of the diaphragm-shutter 9. Referring to FIGS. 4 and 5, the diaphragm-shutter 9 includes a shutter ground plate 92, a cover 96, and a plurality of blades 94 and 95. The cover 96 is provided at a position close to the third unit-ground plate 31. The plurality of blades 94 and 95 is provided between the shutter ground plate 92 and the cover 96 and moves to open and close an opening 96c. The cover 96 and the shutter ground plate 92 are fixed together by using a screw 87.

A stepping motor 91 is an actuator configured to drive the plurality of blades 94 and 95 included in the diaphragm-shutter 9 to open and close. A lever 93, which extends in a direction perpendicular to an axis of a motor shaft, is fixed to the motor shaft of the stepping motor 91. Shafts 93a and 93b, which protrude from the lever 93 in a direction in which the lever 93 extends, are respectively arranged on both edges of the lever 93.

The shaft 93a is inserted into an arc-like hole 92a, a long hole 94a, and the arc-like hole 96a. The arc-like hole 92a is formed on the shutter ground plate 92. The long hole 94a is formed on the blade 94. The arc-like hole 96a is formed on the cover 96. The shaft 93a can move along the arc-like holes 92a and 96a.

The shaft 93b is inserted into an arc-like hole 92b, a long hole 95a, and an arc-like hole 96b. The arc-like hole 92b is formed on the shutter ground plate 92. The long hole 95a is formed on the blade 95. The arc-like hole 96b is formed on the cover 96. The shaft 93b can move along the shape of the arc-like holes 92b and 96b.

When the lever 93 is driven and rotated by the stepping motor 91, the blades 94 and 95 turn in mutually reverse directions. With a reciprocating turning operation of the blades 94 and 95, the opening 96c is opened and closed.

With the above-described configuration, an aperture stop function for controlling the amount of light during shooting is implemented by adjusting a clearance between the blades 94 and 95 configured to open and close the opening 96c. In addition, a shutter function is implemented by moving the blades 94 and 95 from a state in which the opening 96c is open to a state in which the opening 96c is closed.

Returning to FIGS. 1 and 2, the fourth-unit lens 4 is held by a fourth-unit lens holder 41. The fourth-unit lens 4 and the fourth-unit lens holder 41 constitute a fourth lens unit 40. The fourth lens unit 40 is supported and held by the guide shafts 86 and 87 and can move along the optical axis B.

In addition, the fourth lens unit 40 is pressed by a spring (not illustrated) towards the object side. During shooting, the fourth lens unit 40 contacts a stopper (not illustrated) and is fixed at a position illustrated in FIGS. 1 and 2.

The fifth-unit lens 5 is held by a fifth-unit lens unit holder 51. The fifth-unit lens 5 and the fifth-unit lens unit holder 51 constitute a fifth lens unit 50. The fifth lens unit 50 is the second optical member of the present invention. The fifth lens unit 50 is supported and held by the guide shafts 86 and 87 and can move along the optical axis B.

Changing of the magnification and focusing are executed by causing the fifth lens unit 50 to move along the optical axis B by a force transmitted from a screw 42a, which is driven and rotated by the stepping motor 42. The optical filter 7 functions as a low-pass filter configured to cut light of a high spatial frequency and as an infrared-ray cut filter.

Figure 6:
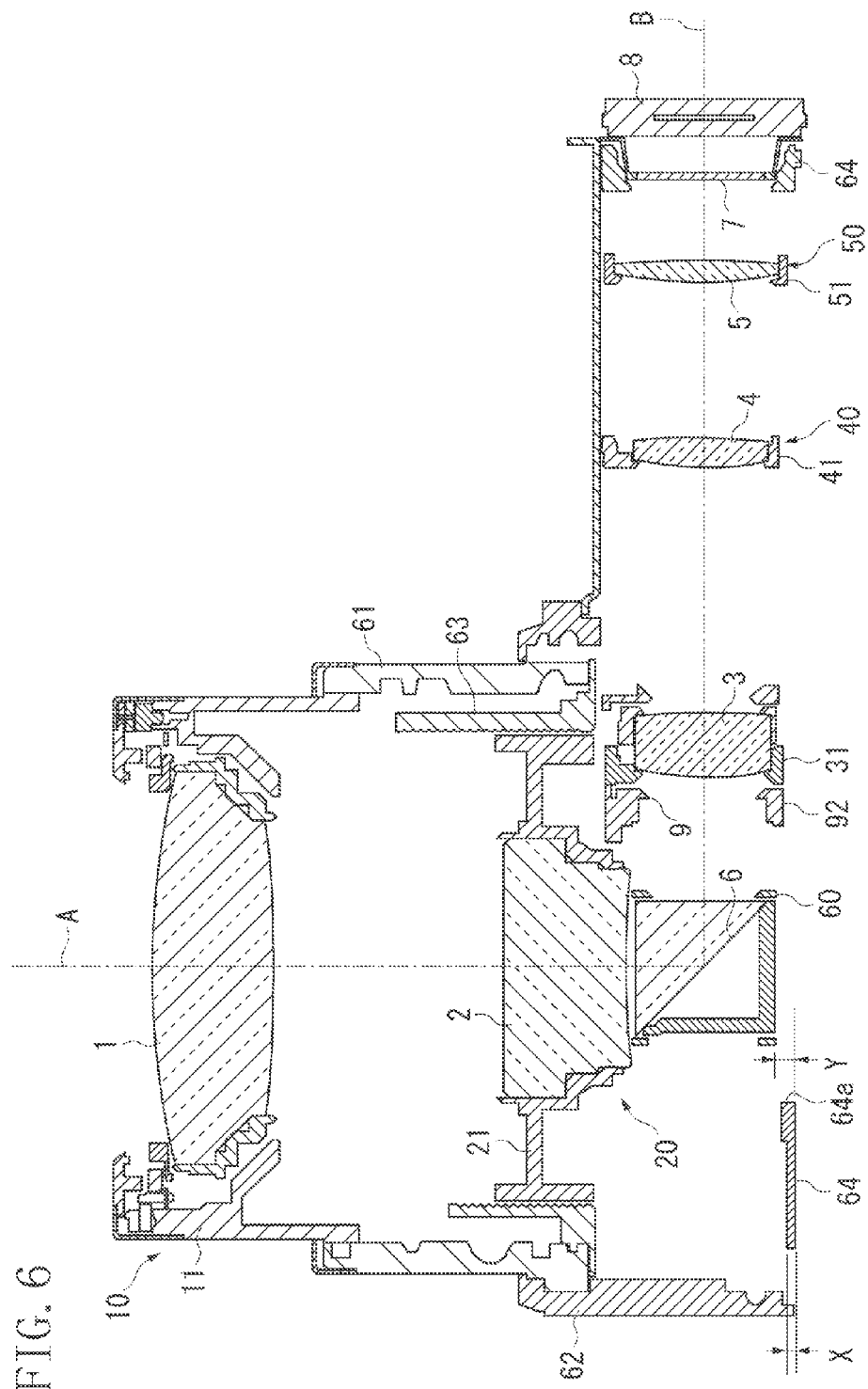
FIG. 6 is a cross section of the main components of the digital camera, in which a lens barrel of the digital camera is positioned at a telephoto end.
Figure 7:
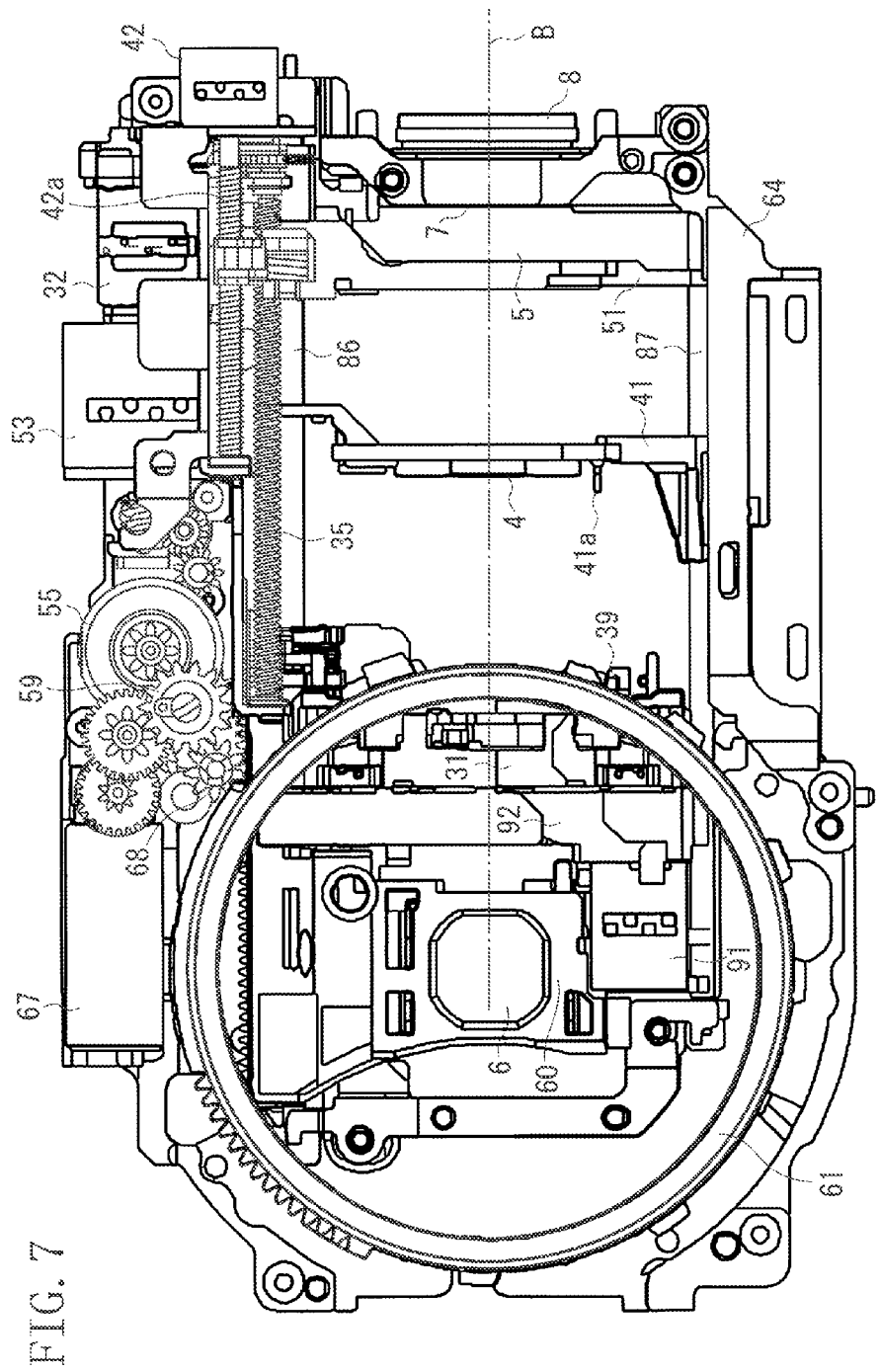
FIG. 7 is a front view of the digital camera illustrating the main components thereof illustrated in FIG. 6, when viewed from the object side of the first lens unit.

FIG. 6 is a cross section of the main components of the digital camera, in which the lens barrel is positioned at a telephoto end. FIG. 7 is a front view of the digital camera illustrating the main components thereof illustrated in FIG. 6, when viewed from the object side of the first lens unit. In the example illustrated in FIG. 7, the first lens unit 10, the second lens unit 20, the fixed barrel 62, and the advancement guide barrel 63 are not illustrated.

Referring to FIG. 6 and FIG. 7, when the lens barrel is positioned at the telephoto end, the first lens unit 10 advances towards the object side along the optical axis A. In addition, the second lens unit 20 stops at a position close to the prism 6 after retracting along the optical axis A.

The third lens unit 30, which is driven by the stepping motor 32, stops at a position close to the prism 6 after moving along the optical axis B towards the prism 6.

As illustrated in FIG. 7, the stepping motor 91, which drives the blades 94 and 95 of the diaphragm-shutter 9 to open and close, is arranged below the prism 6 at a position at which the entire stepping motor 91 is overlapped with the prism 6 and at which the position of the stepping motor 91 in the direction of the optical axis B matches the position of the prism 6.

The fourth lens unit 40, which is driven by the stepping motor 42, stops at a position close to the image sensor 8 after moving towards the image sensor 8 along the optical axis B.

Figure 8:
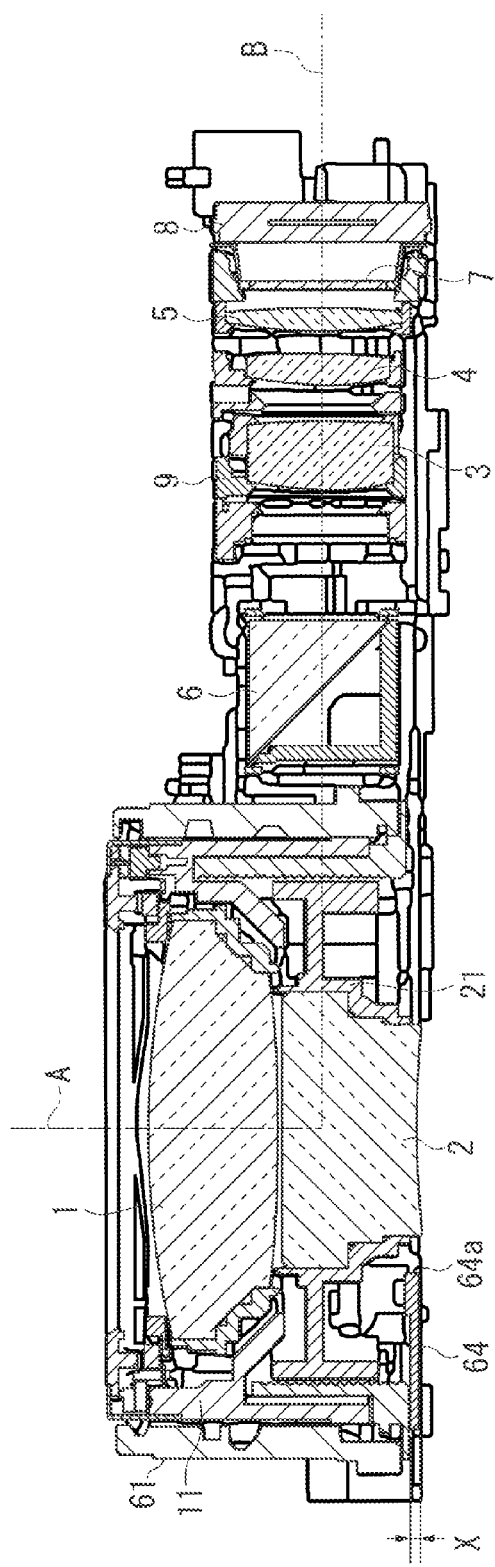
FIG. 8 is a cross section of the main components of the digital camera viewed when the lens barrel is positioned at a sink position (storage position).
Figure 9:
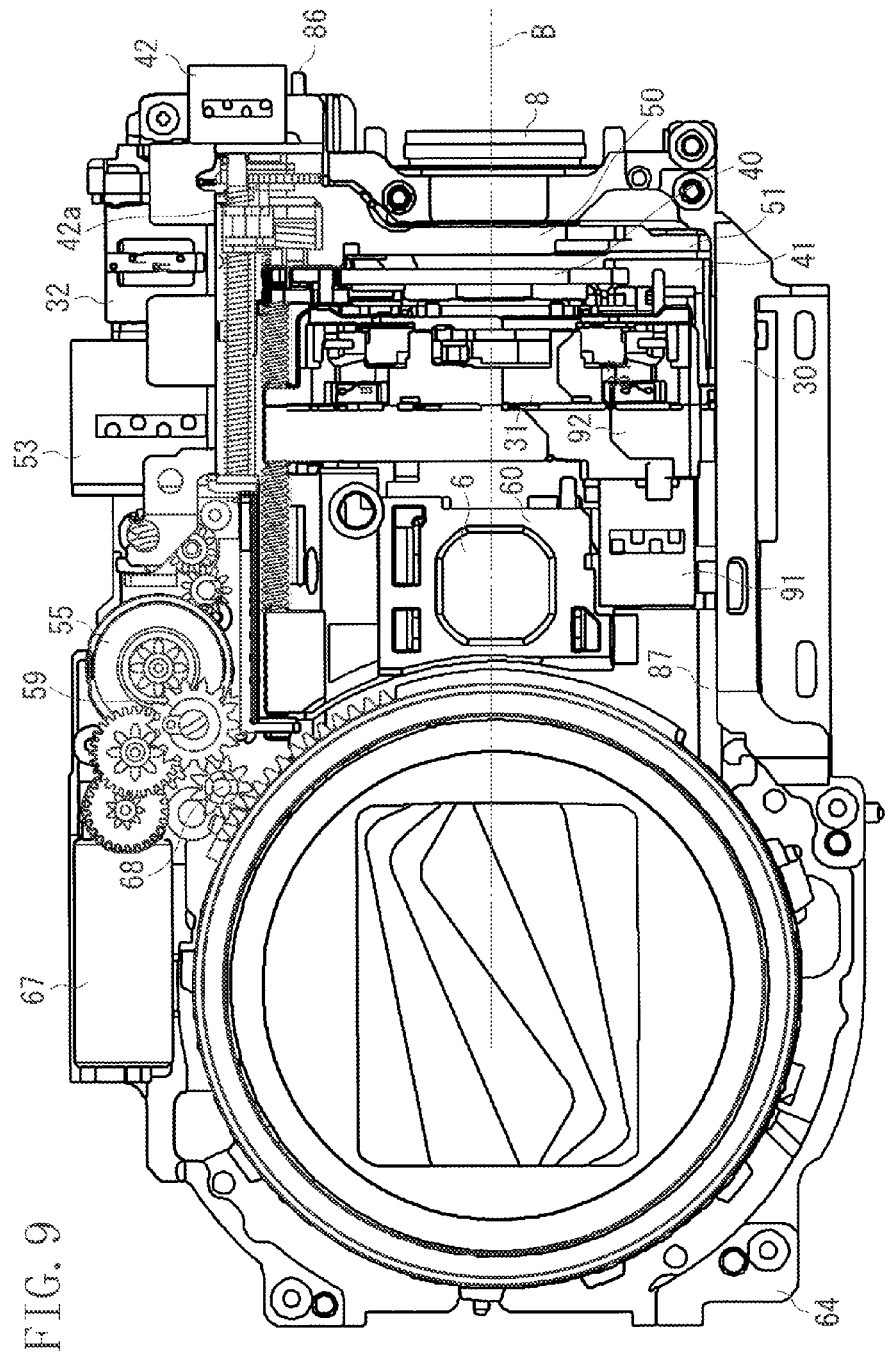
FIG. 9 is a front view of the digital camera illustrating the main components thereof illustrated in FIG. 8, when viewed from the object side of the first lens unit.
Figure 15:
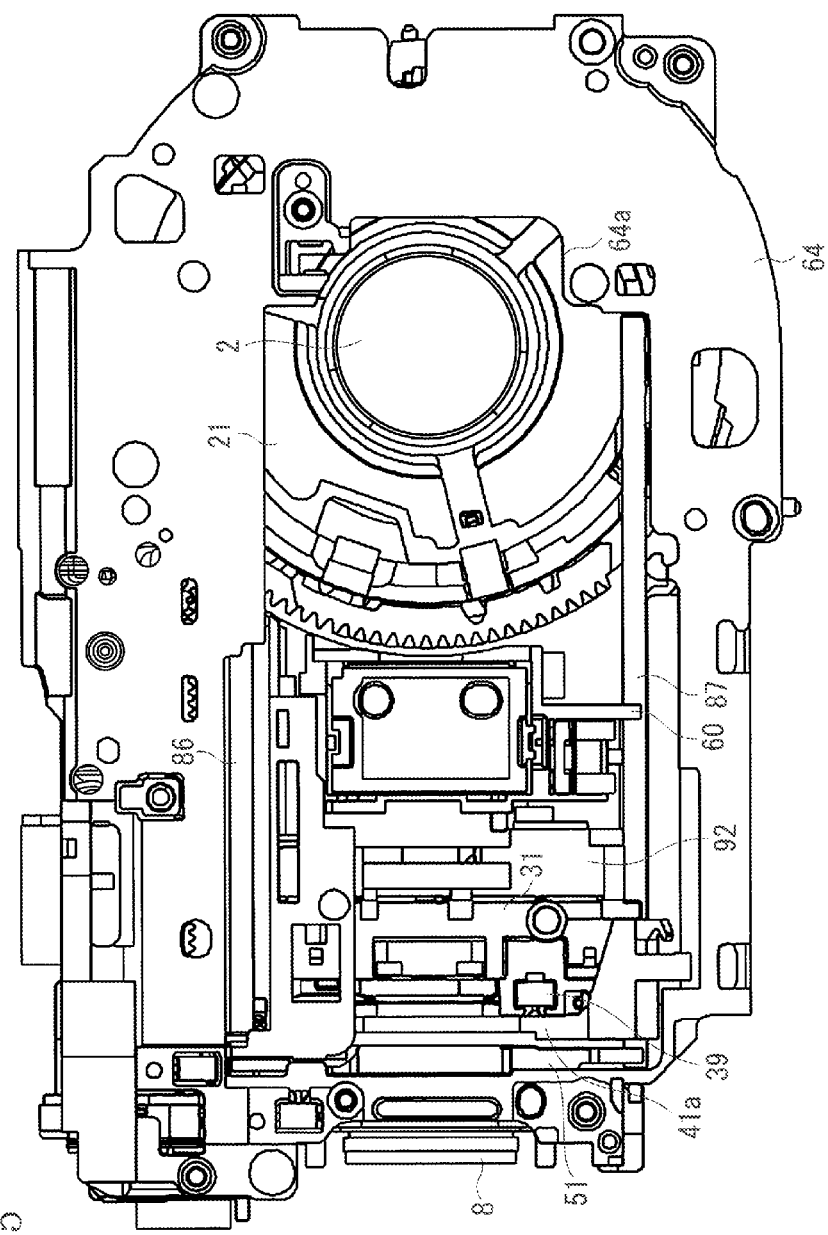
FIG. 15 illustrates a lens barrel positioned at a sink position (storage position) from a back surface side thereof.
Figure 16:
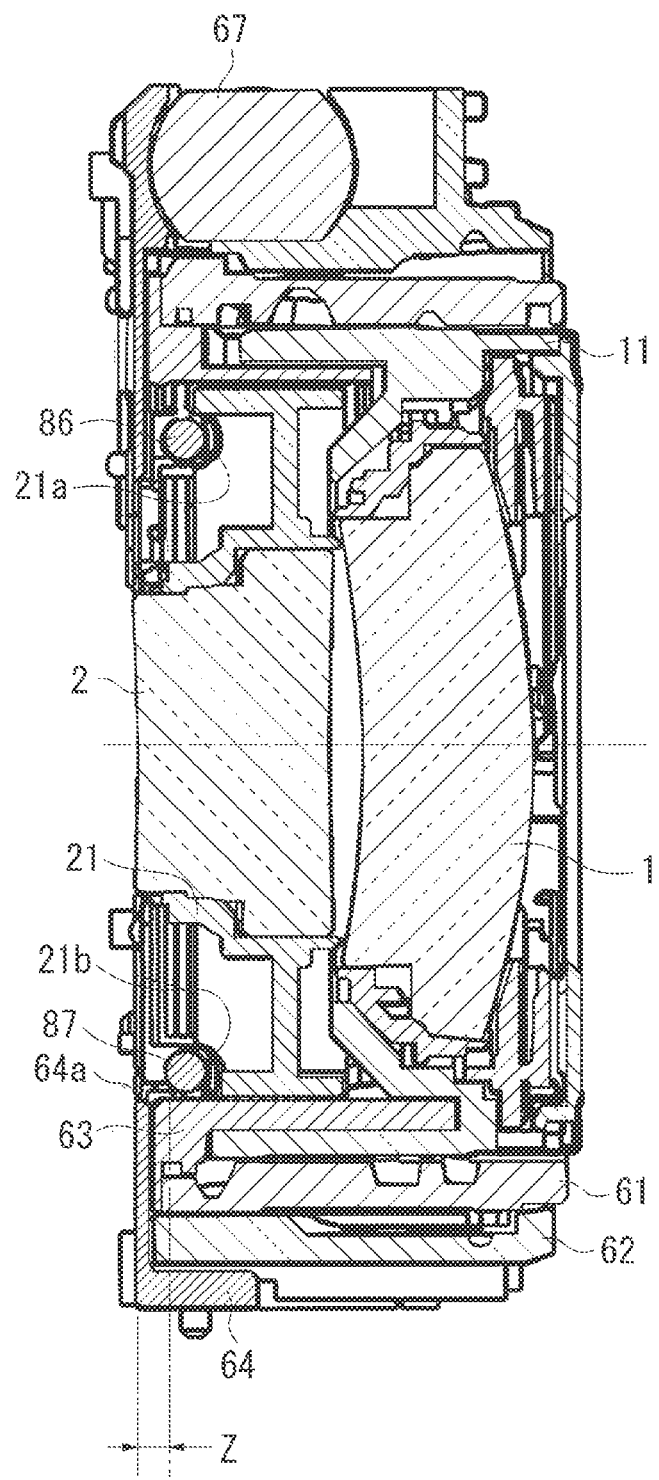
FIG. 16 is a cross section illustrating the main components of the lens barrel positioned at the sink position (storage position) sectioned along a plane perpendicular to an optical axis B.

FIG. 8 is a cross section of the main components of the digital camera viewed when the lens barrel is positioned at a sink position (storage position). FIG. 9 is a front view of the digital camera illustrating the main components thereof illustrated in FIG. 8, when viewed along the optical axis of the first lens unit. FIG. 15 illustrates the lens barrel positioned at the sink position (storage position) from a back surface side thereof. FIG. 16 is a cross section illustrating main components of the lens barrel positioned at the sink position (storage position) sectioned along a plane perpendicular to the optical axis B.

Referring to FIGS. 8, 9, and 16, when the lens barrel is positioned at the sink position, the prism 6, the third lens unit 30, and the fifth lens unit 50 move along the optical axis B towards the image sensor 8 to prevent mutual interference. At this timing, the fourth lens unit 40 is pressed by the third lens unit 30 towards the image sensor 8 to be caused to withdraw to the retracted position. By executing the above-described operation, a storage space is formed at a portion to the rear of the second lens unit 20 and the first lens unit 10.

The zoom body 64 stores the guide shafts 86 and 87 and the optical filter 7. Referring to FIG. 15, the guide shafts 86 and 87 extend to a position at which the guide shafts 86 and 87 are overlapped with the second-unit lens barrel 21, which is arranged within the cam barrel 61, in the direction of the optical axis A at one end in the direction of the shaft of the guide shafts 86 and 87. At the other end in the direction of the shaft of the guide shafts 86 and 87, the guide shafts 86 and 87 extend to a position at which the guide shafts 86 and 87 hold the optical filter 7. In addition, the zoom body 64 stores the fixed barrel 62 on the object side in the direction of the optical axis A. Furthermore, the zoom body 64 stores an array of gears included in the following drive mechanism.

Referring to FIGS. 1, 6, and 8, a dimension X indicates a minimum thickness of a back surface wall of the zoom body 64, which is positioned to the rear of the prism 6 in the direction of the optical axis A (in the opposite direction of the object side) that is yet to move towards the fixed barrel 62, the cam barrel 61, and the image sensor 8.

In addition, a dimension Y indicates a dimension from an outer surface of the back surface wall of the zoom body 64 (the surface opposite to the object side) to the holding member 60 of the prism 6. When calculated according to the minimum thickness of the zoom body 64 and the clearance against the holding member 60, the dimension X and the dimension Y has a relationship Y≧X.

In the present exemplary embodiment, a through hole 64a is formed on the back surface wall of the zoom body 64. The second lens unit 20 can retract through the through hole 64a in the direction of the optical axis A. Accordingly, the space corresponding to the dimension Y, which is formed by the through hole 64a, is included in a retraction space formed in a portion to the rear of the first lens unit 10 and the second lens unit 20 when the holding member 60 of the prism 6 retracts towards the image sensor 8. The second lens unit 20 and the first lens unit 10 retract along the optical axis A into a storage space including the above-described spaces to be stored therein.

In addition, as illustrated in FIG. 16, clearance grooves 21a and 21b, which is provided to prevent an interference between the second lens unit 20 and the guide shafts 86 and 87 that may otherwise occur when the second lens unit 20 retracts along the optical axis A, is formed in a portion corresponding to the guide shafts 86 and 87 of the second-unit lens barrel 21.

Furthermore, in a lens barrel retracted state, the second-unit lens 2 is stored in a position between the guide shafts 86 and 87. In addition, in the lens barrel retracted state, an R2 surface side of the second-unit lens 2 is arranged at a position to the rear of the guide shafts 86 and 87 in the direction of the optical axis A by an amount equivalent to a dimension Z.

As illustrated in FIG. 9, the stepping motor 91, which drives the blades 94 and 95 of the diaphragm-shutter 9 to open and close, is arranged below the prism 6 at a position at which the entire stepping motor 91 is overlapped with the prism 6 and at which the position of the stepping motor 91 in the direction of the optical axis B matches the position of the prism 6.

The fixed barrel 62, the cam barrel 61, and the advancement guide barrel 63 will be described in detail below. In an inner peripheral portion of the fixed barrel 62, cam grooves 62a (FIG. 12) are provided at a plurality of positions in a circumferential direction with substantially even intervals. More specifically, the cam grooves 62a are provided along an outer periphery of the cam barrel 61 and a cam pin (not illustrated) cam-engages the cam groove 62a.

A gear 61a, which engages a drive gear 68 (the drive gear 68 will be described below), is formed on the outer periphery of the cam barrel 61. The cam barrel 61 is driven and rotated by a drive force transmitted from the drive gear 68.

In addition, the cam barrel 61 moves along the optical axis A with a cam effect between the cam groove 62a of the fixed barrel 62 and the cam pin of the cam barrel 61. Furthermore, a first-unit cam groove (not illustrated) and a second-unit cam groove (not illustrated) are formed on the inner periphery of the cam barrel 61.

The advancement guide barrel 63 is provided on the inner periphery of the cam barrel 61 and can rotate integrally with the cam barrel 61 and can move in the direction of the optical axis A. The first lens unit 10 is provided between the cam barrel 61 and the advancement guide barrel 63. A cam pin, which is provided on an outer periphery of the first lens unit barrel 11 of the first lens unit 10, cam-engages the first-unit cam groove of the cam barrel 61.

In addition, an advancement groove (not illustrated), which extends along the optical axis A, is formed on the outer periphery of the advancement guide barrel 63. Furthermore, the first lens unit barrel 11 engages the advancement guide barrel 63 by a protruded portion thereof, which is provided on the inner periphery of the first lens unit barrel 11 and which enters the advancement groove of the advancement guide barrel 63. With this configuration, a rotation of the first lens unit barrel 11 around the optical axis A is regulated.

The second lens unit 20 is arranged on the inner periphery of the advancement guide barrel 63. In addition, the second lens unit 20, similarly to the first lens unit 10, cam-engages the cam barrel 61 by a cam pin (not illustrated), which is provided to the second-unit lens barrel 21 and which enters the second-unit cam groove of the cam barrel 61.

In addition, a through groove (not illustrated) is provided to the advancement guide barrel 63 in the direction of the optical axis A. An engagement portion, which is provided at a basal portion of the cam pin of the second-unit lens barrel 21, engages and enters the through hole of the advancement guide barrel 63. In this manner, the movement of the second-unit lens barrel 21 in a rotation direction thereof is regulated.

When the cam barrel 61 rotates, the first lens unit barrel 11 moves along the optical axis in relation to the cam barrel 61 with the protruded portion of the first lens unit barrel 11 sliding along the advancement groove of the advancement guide barrel 63 in the direction of the optical axis A. The advancement and retraction of the first lens unit barrel 11 described above is caused by a cam effect between the first-unit cam groove of the cam barrel 61 and the cam pin of the first lens unit barrel 11.

Accordingly, when the cam barrel 61 moves along the optical axis A relative to the fixed barrel 62, the first lens unit barrel 11 moves along the optical axis A relative to the cam barrel 61 and the first-unit lens 1 moves between the storage position and the shooting position. In addition, the second-unit lens 2 moves between the storage position and the shooting position by a similar movement.

Figure 10:
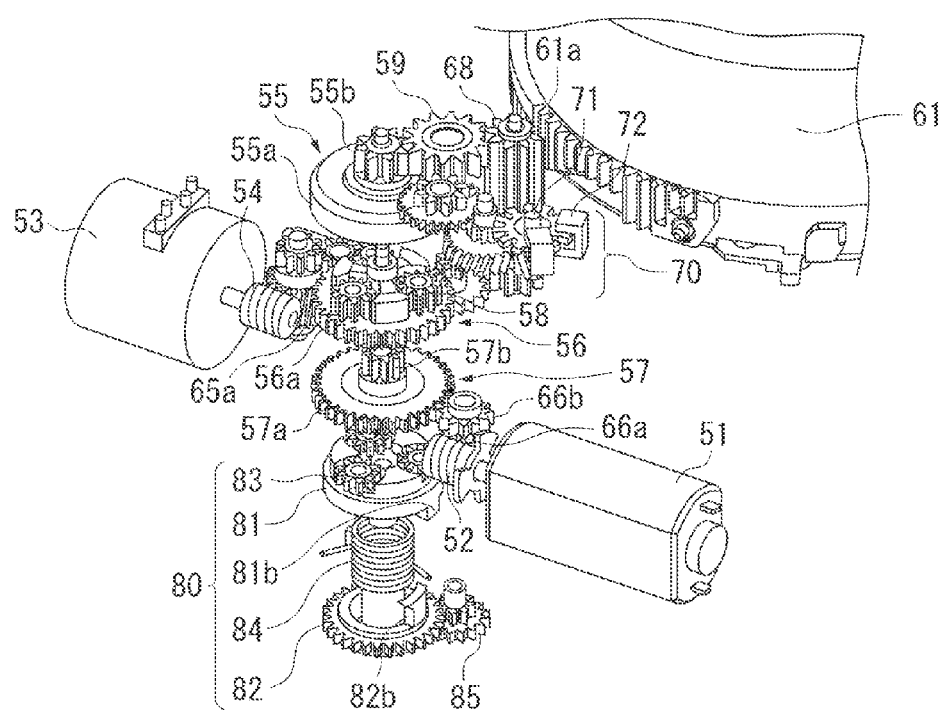
FIG. 10 is a perspective exploded perspective view of a cam barrel and a part of a mechanism for driving a prism.

The drive mechanism for the cam barrel 61 and the prism 6 will be described in detail below with reference to FIGS. 10 through 14. FIG. 10 is an exploded perspective view of the cam barrel 61 and a part of the mechanism for driving the prism 6.

Referring to FIGS. 10 through 14, a SW motor 67 is a drive source for moving the first lens unit 10 and the second lens unit 20 between the sink position and the wide-angle end. A TW motor 53 is a drive source for moving the first lens unit 10 and the second lens unit 20 between the telephoto end and the wide-angle end.

Each of the SW motor 67 and the TW motor 53 is arranged in the following manner. That is, a motor axis of each motor is oriented towards the optical axis B and a motor shaft of each motor is oriented inwards in a direction of the diameter of the cam barrel 61. The TW motor 53 is arranged closer to the object side than the SW motor 67 is. A worm gear 52 is press-fit around the motor shaft of the SW motor 67. In addition, a worm gear 54 is press-fit around the motor shaft of the TW motor 53.

A zoom ring gear 55, a zoom carrier gear 56, and a sun gear 57 are arranged on the same axis and in parallel to the optical axis A in this order from the object side (from the upper portion of FIG. 10) between the worm gear 52 and the worm gear 54.

The sun gear 57 includes sun gears 57a through 57c, which is constituted by flat gears of three steps. A gear 66b, which engages the sun gear 57a, further engages the worm gear 52 via a helical gear 66a.

The zoom carrier gear 56 includes a gear 56a and three shafts, which are provided on a surface of the gear 56a facing the object side with substantially even intervals in the circumferential direction. A zoom planet gear 58 is pivoted by each of the three shafts. In addition, the worm gear 54 engages a flat gear 65a via a helical gear 65b. The zoom planet gear 58 engages a gear 57b.

The zoom ring gear 55 includes an internal gear 55a and an external gear 55b. The zoom planet gear 58 engages the internal gear 55a. The external gear 55b engages the drive gear 68 via an idler gear 59. Furthermore, the drive gear 68 engages the gear 61a of the cam barrel 61.

A prism drive unit 80 will be described in detail below. The prism drive unit 80 is arranged below the sun gear 57. Furthermore, the prism drive unit 80 includes, in order from the object side, a prism carrier 81, a torsion spring 84, and a prism delay gear 82. The prism carrier 81, the torsion spring 84, and 87 are arranged on the same axis as the axis of the sun gear 57. The prism delay gear 82 is rotatably pivoted by the prism carrier 81.

Three shafts are provided on the surface of the prism carrier 81 facing the object side in the circumferential direction with substantially even intervals. A prism planet gear 83 is pivoted at each of the three shafts. The prism planet gear 83 engages a sun gear 57c and an internal gear fixedly provided on a gear ground plate (not illustrated).

A prism drive gear 85 engages a gear of the prism delay gear 82. Latches 81b and 82b, which extend in a mutually opposing direction, are provided to the prism carrier 81 and the prism delay gear 82, respectively. The latch 81b is arranged at a position inner side of the latch 82b in the diameter direction (see FIG. 13A).

The torsion spring 84 includes a coil and two arms 84a and 84b. The arms 84a and 84b extend from both ends of the coil externally in the diameter direction. The two arms 84a and 84b are latched with the latches 82b and 81b of the prism delay gear 82 and the prism carrier 81.

Figure 13A:
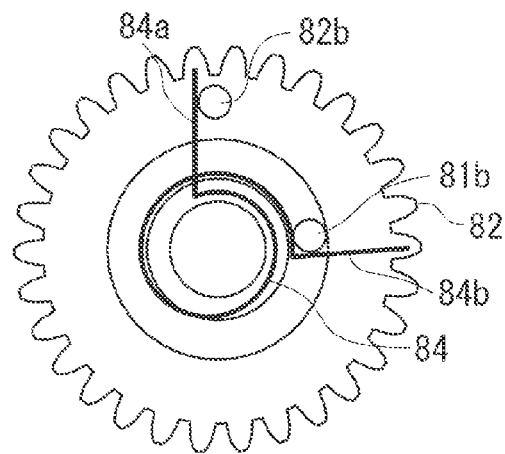
FIGS. 13A through 13C illustrate a phase relationship between a prism carrier and a prism delay gear, and an amount of charge applied to a torsion spring.
Figure 13B:
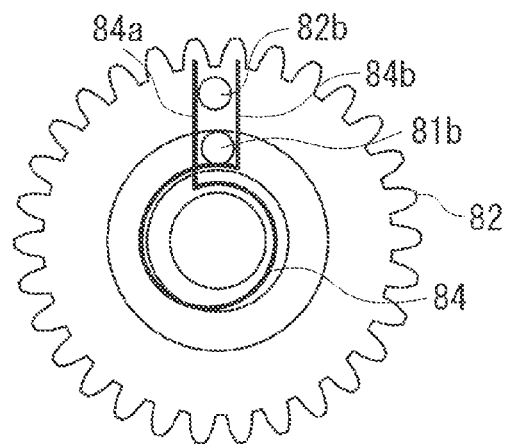

During assembly, the two arms 84a and 84b of the torsion spring 84 are precharged by being latched at the latch 82b in a state in which the latches 82b and 81b are arranged at the same phase (see FIG. 13B).

In this state, when the prism delay gear 82 is allowed to freely rotate to rotate the prism carrier 81, the prism carrier 81, the prism delay gear 82, and the torsion spring 84 integrally rotate. On the other hand, when the prism carrier 81 is rotated in a state in which the rotation of the prism delay gear 82 is regulated, only the prism carrier 81 rotates while the torsion spring 84 is overcharged.

Figure 11:
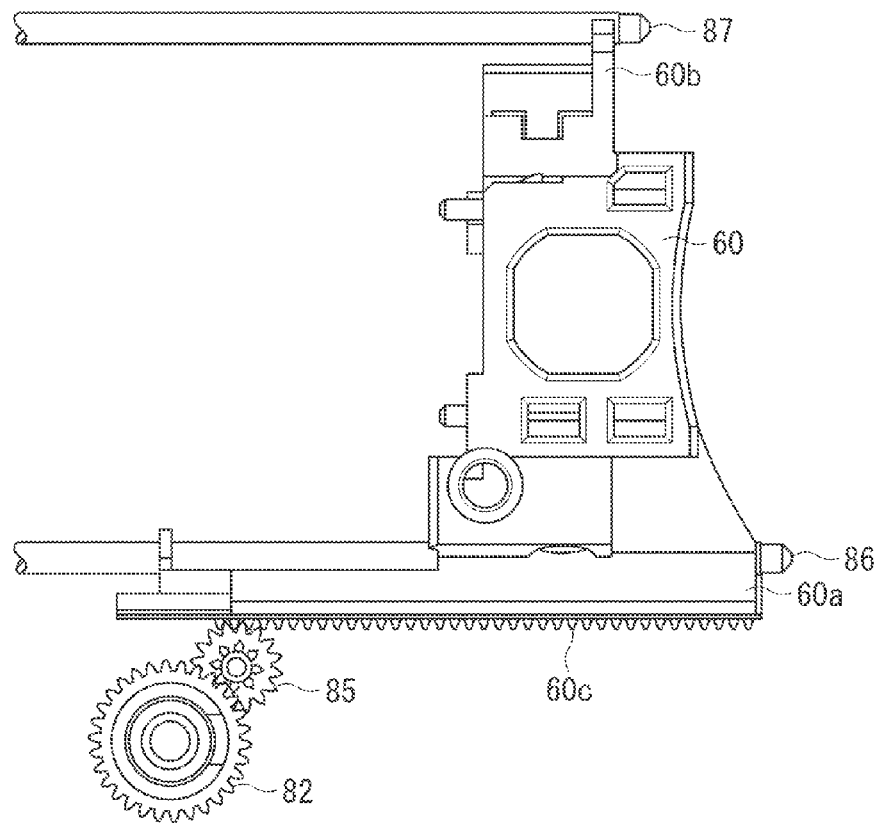
FIG. 11 is a plan view illustrating a holding member configured to hold a prism and a part of a prism drive unit.

FIG. 11 is a plan view illustrating the holding member 60 configured to hold the prism 6 and a part of the prism drive unit 80.

Referring to FIG. 11, engaging portions 60a and 60b are formed on the holding member 60. The engaging portions 60a and 60b movably engage the two guide shafts 86 and 87, which are guide members provided in parallel to each other and extending in the direction of the optical axis B.

A rack gear 60c is formed on the engaging portion 60a. The rack gear 60c engages the prism drive gear 85. Accordingly, when the prism drive gear 85 rotates, the holding member 60 moves back and forth along the optical axis B integrally with the prism 6.

Returning to FIG. 10, operations of the cam barrel 61 and the prism 6 will be described in detail.

When the SW motor 67 is driven and the TW motor 53 is stopped, a drive force is transmitted from the SW motor 67 to the sun gear 57. Accordingly, the sun gear 57 rotates in this state but the zoom carrier gear 56, which is connected to the TW motor 53, is stopped. Therefore, the zoom planet gear 58 only rotates without revolving.

For example, if the gear 57b has nine teeth, the zoom planet gear 58 has ten teeth, and the internal gear 55a of the zoom ring gear 55 has thirty teeth, then the speed of rotation of the sun gear 57 is decreased to 1/3.33 of the original speed. This rotational force is transmitted to the zoom ring gear 55.

Accordingly, the rotation of the external gear 55b is transmitted to the drive gear 68 via the idler gear 59. In addition, the rotation of the drive gear 68 is transmitted to the gear 61*a* of the cam barrel 61. In this manner, the cam barrel 61 is driven and rotated.

The zoom ring gear 55 rotates in a reverse direction of the rotation of the sun gear 57. In addition, the rotation of the sun gear 57 is transmitted to the prism carrier 81 via the prism planet gear 83.

If the holding member 60 can move in the direction of the optical axis B, the torsion spring 84 and the prism delay gear 82 rotate integrally with the prism carrier 81 and the holding member 60 moves back and forth in the direction of the optical axis B.

On the other hand, if the movement of the holding member 60 in the direction of the optical axis B is regulated, the prism delay gear 82 cannot rotate. Accordingly, the torsion spring 84 absorbs the rotation of the prism carrier 81 while being overcharged.

When the SW motor 67 is stopped and the TW motor 53 is driven, the sun gear 57, which is connected to the SW motor 67, stops. On the other hand, the zoom carrier gear 56, which is connected to the TW motor 53, rotates. Accordingly, the zoom planet gear 58 revolves while rotating.

For example, if the gear 57*b* has nine teeth, the zoom planet gear 58 has ten teeth, and the internal gear 55*a* of the zoom ring gear 55 has thirty teeth, then the speed of rotation of the sun gear 57 is increased by 30%. This rotational force is transmitted to the zoom ring gear 55. In this manner, the cam barrel 61 is driven and rotated.

In this case, the rotation direction of the zoom ring gear 55 is the same as the rotation direction of the zoom carrier gear 56. In addition, because the sun gear 57 is stopped in this case, the prism carrier 81 is also stopped. Therefore, no drive force is transmitted to the holding member 60.

When the SW motor 67 and the TW motor 53 are driven at the same time, a combined number of rotations (revolutions per minute (rpm)) is transmitted to the zoom ring gear 55. For example, suppose that the sun gear 57 is rotated at 1 rpm in the clockwise (CW) direction and that the zoom carrier gear 56 is rotated at 1 rpm in the CW direction.

In this case, the number of rotations that should be transmitted from the sun gear 57 to the zoom ring gear 55 is 0.3 rpm in the counterclockwise (CCW) direction. Furthermore, in this case, the number of rotations that should be transmitted from the zoom carrier gear 56 to the zoom ring gear 55 is 1.3 rpm in the CW direction. Therefore, as a result of combining the above-described number of rotations together, the zoom ring gear 55 rotates at 1 rpm in the CW direction.

Suppose that the sun gear 57 is rotated at 1.3 rpm in the CW direction and that the zoom carrier gear 56 is rotated at 0.3 rpm in the CW direction. In this case, the number of rotations that should be transmitted from the sun gear 57 to the zoom ring gear 55 is 0.39 rpm in the CCW direction. Furthermore, in this case, the number of rotations that should be transmitted from the zoom carrier gear 56 to the zoom ring gear 55 is 0.39 rpm in the CW direction. Therefore, as a result of combining the above-described number of rotations together, the zoom ring gear 55 stops.

As described above, it can be understood that by appropriately selecting and setting the number of rotations and the direction of rotation of the SW motor 67 and the TW motor 53, the prism 6 can be driven when the cam barrel 61 is stopped. In addition, it can also be understood that a speed decreasing ratio of the array of gears connected to the SW motor 67 becomes high while the speed decreasing ratio of the array of gears connected to the TW motor 53 becomes low. The speed decreasing ratios will be described in detail later.

An operation for moving the prism 6 to the shooting position by advancing and moving the first lens unit 10 and the second lens unit 20 in the direction of the optical axis A will be described in detail below with reference to FIGS. 12 and 13A through 13C.

Figure 12:
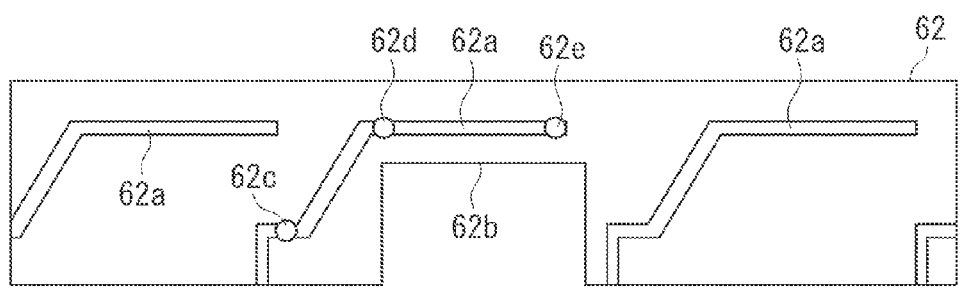
FIG. 12 is an expansion view of a fixed barrel viewed from an inner periphery thereof.

FIG. 12 is an expansion view of the fixed barrel 62 viewed from an inner periphery thereof. Referring to FIG. 12, in the inner peripheral portion of the fixed barrel 62, the cam grooves 62*a* (FIG. 12) are provided at a plurality of positions in a circumferential direction with substantially even intervals. More specifically, the cam grooves 62*a* are provided along the outer periphery of the cam barrel 61 and a cam pin (not illustrated) cam-engages the cam groove 62*a*. In addition, a notch 62*b* is formed on a rear edge of the fixed barrel 62. The holding member 60, which holds the prism 6, comes through the notch 62*b* when the holding member 60 moves back and forth in the direction of the optical axis B.

In addition, similar to the second-unit lens barrel 21, clearance grooves (not illustrated) for preventing an interference between the cam barrel 61 and the advancement guide barrel 63 and the guide shafts 86 and 87, which may otherwise occur when the cam barrel 61 and the advancement guide barrel 63 retract to the sink position (retraction position) along the optical axis A, are formed at portions of the cam barrel 61 and the advancement guide barrel 63 corresponding to the guide shafts 86 and 87. The cam barrel 61 and the advancement guide barrel 63 correspond to an example of a drive barrel of the present invention.

Figure 13C:
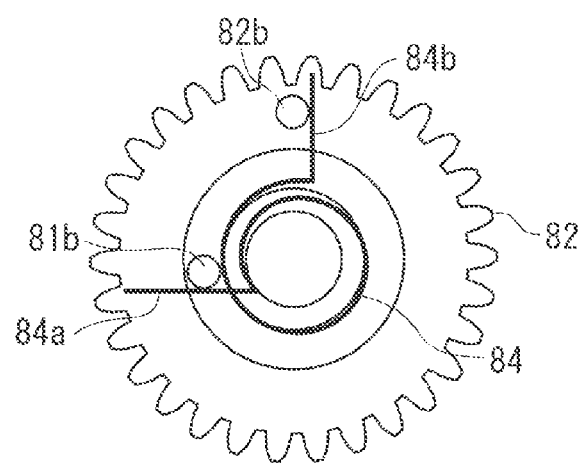
Figure 14:
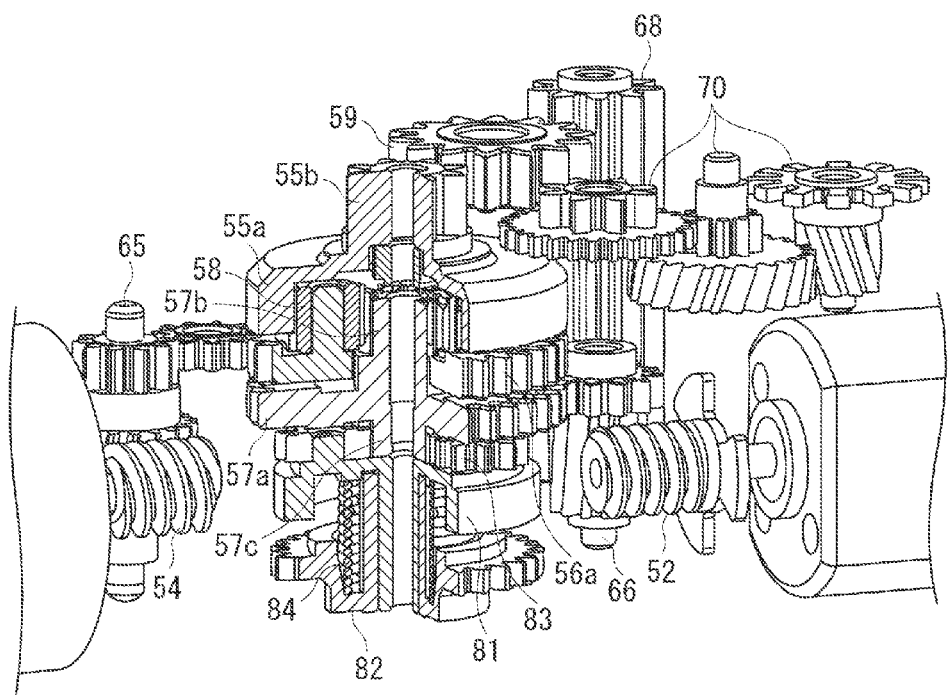
FIG. 14 is a perspective view illustrating a partial cross section of a cam barrel and a prism drive mechanism.

FIGS. 13A through 13C illustrate a phase relationship between the prism carrier 81 and the prism delay gear 82 and an amount of charge applied to the torsion spring 84.

When the lens barrel is positioned at the sink position, the cam pin of the cam barrel 61 is positioned at a position 62*c* in FIG. 12 within the cam groove 62*a* of the fixed barrel 62. In this state, the prism carrier 81 and the prism delay gear 82 are in the phase relation in which the torsion spring 84 is overcharged as illustrated in FIG. 13A.

In this state, the holding member 60 is pressed by the charging force from the torsion spring 84 towards the retraction direction along the optical axis B (i.e., towards the image sensor 8). Furthermore, the movement of the holding member 60 in the retraction direction is regulated by a mechanical end (not illustrated).

To set the lens barrel to the shooting mode (state), at first, the SW motor 67 is rotated in the direction of advancement of the cam barrel 61. In this state, the cam pin of the cam barrel 61 moves in and along the cam groove 62*a* of the fixed barrel 62 rightwards in FIG. 2. In addition, the first lens unit 10 and the second lens unit 20 move along the optical axis A in the direction of advancement in a segment in which a lift is provided.

During the advancement operation, the prism carrier 81 also rotates in the direction of advancement of the holding member 60 to the shooting position. In this state, because the torsion spring 84 is being overcharged, the prism delay gear 82 remains being stopped. Therefore, the holding member 60 does not move from the retraction position.

When the cam barrel 61 has advanced in the direction of the optical axis A and a space into which the holding member 60 can move towards the shooting position is formed, the phase of the latch 81*b* of the prism carrier 81 and the latch 82*b* of the prism delay gear 82 match each other as illustrated in FIG. 13B.

When the SW motor 67 is rotated in the direction of advancement of the cam barrel 61, the cam pin of the cam barrel 61 moves in and along the cam groove 62*a* of the fixed barrel 62 rightwards in FIG. 12. At the same time, the holding member 60 moves to the shooting position.

When the cam barrel 61 reaches the wide-angle end, the TW motor 53 is driven in the direction of retraction of the cam barrel 61 in a state in which the SW motor 67 is driven in the direction of advancement of the cam barrel 61. Accordingly, only the holding member 60 continues moving towards the shooting position in the direction of the optical axis B when the cam barrel 61 is stopped at the wide-angle end.

When the holding member 60 reaches the shooting position, the holding member 60 contacts a shooting side stopper (not illustrated) and stops there. The prism delay gear 82 stops at the same time as the holding member 60 stops. In this case, by further continuing the driving of the SW motor 67 in the direction of advancement of the cam barrel 61, the prism carrier 81 continues to cause the holding member 60 to rotate in the direction of the shooting position and overcharges the torsion spring 84.

By overcharging the torsion spring 84 with an appropriate force, the holding member 60 is pressed against the shooting side stopper (not illustrated) by the effect of the torsion spring 84. Accordingly, the position and the attitude of the holding member 60 can be stabilized during shooting.

When the torsion spring 84 is overcharged to a predetermined overcharge state, the SW motor 67 and the TW motor 53 are stopped.

By executing the above-described operation, the first lens unit 10, the second lens unit 20, and the prism 6 are moved to the wide-angle end. In this state, the operation state of the lens barrel becomes the shooting state. When the cam barrel 61 reaches the wide-angle end, the cam pin moves to a position 62d in the cam groove 62a of the fixed barrel 62. Subsequently, the third lens unit 30 and the fourth lens unit 40 are moved to a predetermined position along the optical axis B.

By executing the above-described operations in reversed order, the lens barrel can be moved from the wide-angle end to the SINK position. More specifically, at first, the third lens unit 30 and the fourth lens unit 40 are retracted towards the image sensor 8 along the optical axis B.

Then, while driving the TW motor 53 in the advancement direction of the cam barrel 61, the SW motor 67 is driven in the direction of retraction of the cam barrel 61 at the same time. In this state, the cam barrel 61 does not rotate but only the prism carrier 81 rotates in the direction of advancement of the holding member 60 to the shooting position.

In addition, the prism carrier 81 rotates by an amount equivalent to the overcharge of the torsion spring 84. Accordingly, the phase of the latch 81b of the prism carrier 81 and the latch 82b of the prism delay gear 82 match each other. In this state, the prism delay gear 82 rotates in the direction of retraction of the holding member 60 to the retraction position integrally with the prism carrier 81 and the torsion spring 84. Accordingly, the holding member 60 moves in the retraction direction.

After the holding member 60 has moved to the retraction position and a storage space is formed in a portion to the rear of the cam barrel 61, the TW motor 53 stops and only the SW motor 67 continues driving in the direction of retraction of the cam barrel 61. Accordingly, the cam barrel 61 starts its retraction. When the holding member 60 reaches the retraction position, the holding member 60 contacts a retraction side mechanical end (not illustrated) and stops there. The prism delay gear 82 stops at the same time.

The SW motor 67 continues driving until the cam barrel 61 is retracted to the storage position. Accordingly, the prism carrier 81, while overcharging the torsion spring 84, continues to rotate the holding member 60 in the direction of retraction of the holding member 60. After the cam barrel 61 reaches and is stored at the sink position and the first lens unit 10 and the second lens unit 20 are stored, the SW motor 67 stops.

In executing a variable magnification operation by moving the lens barrel between the wide-angle end and the telephoto end, the first lens unit 10 and the second lens unit 20 can be moved in the direction of optical axis A without moving the holding member 60 in the direction of the optical axis B by driving the TW motor 53 only. When the lens barrel is positioned at the telephoto end, the cam pin of the cam barrel 61 is positioned at a position 62e in the cam groove 62a of the fixed barrel 62 (see FIG. 12).

Now, an effect of the above-described configuration, in which the speed decreasing ratio of the array of gears connected to the SW motor 67 is high and the speed decreasing ratio of the array of gears connected to the TW motor 53 is low, will be described in detail below.

In general, the load of driving the cam barrel 61 is higher in a region from the sink position to a shooting region, whose lift angle of the cam groove 62a of the fixed barrel 62 is high, than in a shooting region from the wide-angle end to the telephoto end. In the region from the sink position to the shooting region, a further load of operating a lens barrier may often be applied. Accordingly, it is necessary to increase a torque of the motor by using the gear array whose speed decreasing ratio is high.

On the other hand, for the shooting range from the wide-angle end to the telephoto end, it is necessary to keep the number of rotations of the motor low to prevent undesired recording of the noise generated by driving the lens during shooting of a moving image. In this case, if a gear array having a high speed decreasing ratio is used, the rotation speed of the cam barrel may become extremely low.

In the present exemplary embodiment, in the region from the sink position to the shooting range, in which the load of the cam barrel 61 is high, the cam barrel 61 is driven by transmitting the drive force from the SW motor 67 to the cam barrel 61 via the gear array having a high speed decreasing ratio.

On the other hand, in the shooting region from the wide-angle end to the telephoto end, the cam barrel 61 is driven by transmitting the drive force from the TW motor 53 to the cam barrel 61 via the gear array having a low speed decreasing ratio to the cam barrel 61. Accordingly, even if the TW motor 53 is rotated at a low speed to maintain a low noise-state while driving the motor during shooting of a moving image, the variable magnification operation can be executed at an appropriate operation speed.

In the present exemplary embodiment, different types of motors can be used for the SW motor 67 and the TW motor 53. For example, a direct current (DC) motor can be used as the SW motor 67, and a stepping motor can be used as the TW motor 53. In general, a stepping motor can be more stably controlled at a low speed compared with a DC motor. Therefore, a stepping motor can be used when the motor is driven at a low speed during a moving image shooting operation.

In addition, for a method for driving the stepping motor, a microstep drive method or a two-phase excitation drive method can be selected and used. If the microstep drive method is used, the motor can be driven in a more highly silent operation state. On the other hand, if the two-phase drive method is used, the motor can be driven with a higher torque. Accordingly, the method can be selectively used. More specifically, the microstep drive method can be used for changing the magnification in shooting a moving image, in which it is necessary to maintain a sufficient level of silence.

On the other hand, the two-phase drive method can be used for changing the magnification in shooting a still image.

With the configuration of the array of gears of the drive mechanism according to the present exemplary embodiment, the cam barrel 61 can be driven regardless of which of the SW motor 67 and the TW motor 53 is driven in all the region from the sink position to the telephoto end.

Therefore, the drive method can be selectively used in the following manner. That is, if it is necessary to change the magnification at a high speed, the SW motor 67 is used. On the other hand, if it is necessary to execute variable magnification at a low speed, the TW motor 53 is used.

Returning to FIG. 10, the pulse gear array 70 will be described in detail below, which is configured to detect the position of the first lens unit 10 and the second lens unit 20 in the direction of the optical axis A.

Referring to FIG. 10, the pulse gear array 70 is connected to the zoom ring gear 55 and the idler gear 59, which are output gears of a planet gear array. A plurality of blades is provided to a pulse board 71 of a last stage of the pulse gear array 70. A photo-interrupter 72 counts the number of times of passage of the plurality of blades. In this manner, the amount of rotation of the cam barrel 61 is detected. The speed increasing ratio of the pulse gear array 70 and the number of blades of the pulse board 71 are determined at the ratio and the number with which a necessarily high resolution, which is set according to an optical design, can be achieved.

Essentially, if a gear array is used to transmit a drive force from a motor, the amount of rotation of a cam barrel is linearly determined according to the speed decreasing ration in relation to the rotation amount of the motor because the loss of rotation amount, which may otherwise arise due to sliding, may not arise. However, in an actual operation, the amount of rotation of the cam barrel may vary and become uneven in relation to the rotation amount of the motor due to a backlash or an engagement error of the gears.

However, in a conventional lens barrel, in which one motor drives one cam barrel, the engagement relationship among the gears may not vary when the motor is driven once the gear array is assembled. More specifically, because the same pairs of gears engage in every rotation, the state of variation of the rotation amount of the cam barrel in relation to the motor rotation amount is the same for every rotation. Therefore, if the amount of rotation of the cam barrel is calculated according to the motor rotation amount, the calculated cam barrel rotation amount has only a small amount of error from the actual cam barrel rotation amount.

On the other hand, if one cam barrel is driven by utilizing the rotational force generated by combining the rotational forces equivalent to the amounts of rotation of the two motors, which is achieved by using the planet gear array, as in the present exemplary embodiment, when one motor is rotate, the relationship between the teeth of the other motor and teeth of the zoom ring gear 55 may vary.

In other words, because the gear engages with a different gear every time the camera is powered on, the state of variation of the cam barrel rotation amount in relation to the motor rotation amount may be different each time the camera is powered on. Accordingly, even if the cam barrel rotation amount is calculated according to the motor rotation amount, the error of the calculated cam barrel rotation amount with respect to the actual cam barrel rotation amount may become large.

However, in the present exemplary embodiment, the pulse gear array 70 is branched from the idler gear 59, which is provided between the zoom ring gear 55 and the cam barrel 61, which are output gears of the planet gear array. Accordingly, the engagement relationship between the teeth of the gears of the pulse gear array 70 and the cam barrel 61 are invariant. Accordingly, the present exemplary embodiment can detect the amount of rotation of the cam barrel with an error whose level is as low as that of a conventional lens barrel.

As described above, in the present exemplary embodiment, the through hole 64a is formed on the back surface wall of the zoom body 64. Accordingly, the space corresponding to the dimension Y of the through hole 64a (a space that is at least larger than a space corresponding to the dimension X) is included in the retraction space formed in the portion to the rear of the first lens unit 10 and the second lens unit 20.

In addition, in the present exemplary embodiment, the clearance grooves for preventing an interference of the second-unit lens barrel 21, the cam barrel 61, and the advancement guide barrel 63 with the guide shafts 86 and 87, which may otherwise occur when the second-unit lens barrel 21, when the first lens unit 10 and the second lens unit 20 retract along the optical axis A, are provided to the second-unit lens barrel 21, the cam barrel 61, and the advancement guide barrel 63. More specifically, the notches (i.e., the notches 61a and 61b and 63a and 63b) are provided at portions of the second-unit lens barrel 21, the cam barrel 61, and the advancement guide barrel 63 corresponding to the guide shafts 86 and 87.

Accordingly, the space into which the first lens unit 10 and the second lens unit 20, which are arranged along the optical axis (the light-incidence optical axis) A, are to be retracted can be enlarged. As a result, the thickness of the digital camera in the lens barrel retracted state can be further reduced.

The configuration of the present invention is not limited to the above-described exemplary embodiment. More specifically, a material of each component, the shape, the dimension, the type, the number, and the arrangement location of each component can be appropriately changed or modified within the scope of the present invention.

In addition, in the above-described exemplary embodiment, the prism 6 is described as an example of the reflection optical element. However, the present invention is not limited to this. More specifically, a different optical member, such as a mirror, can be used as the reflection optical element.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-183296 filed Aug. 18, 2010, which is hereby incorporated by reference herein in its entirety.

What is claimed is:

1. An imaging apparatus including a zoom type lens barrel configured to change a shooting magnification by moving between a storage position and a shooting position in a direction of an optical axis, the imaging apparatus comprising:

a lens unit arranged to be movable along a first optical axis;

a reflection optical element configured to move along a second optical axis, which extends in a direction intersecting with the first optical axis, wherein the reflection optical element bends a light flux incident from the lens unit in a direction of the second optical axis to guide the incident light flux onto an image plane when the lens unit moves to the shooting position along the first optical axis, wherein the reflection optical element forms a storage space for storing the lens unit by moving to a retraction position along the second optical axis when the lens unit moves to the storage position along the first optical axis;

an optical system arranged between the reflection optical element and the image plane; and a lens barrel holding frame having a back surface wall positioned at a position on the reflection optical element, in a state before moving to the retraction position, opposite to the lens unit in a direction of the first optical axis, wherein a through hole is formed on the back surface wall of the lens barrel holding frame, wherein the lens unit retracts along the first optical axis toward the through hole.

2. The imaging apparatus according to claim 1, further comprising a guide shaft configured to support the reflection optical element and the optical system to be movable along the second optical axis, wherein a clearance groove is formed on the lens unit and at a portion, which corresponds to the guide shaft of a drive barrel, configured to drive the lens unit in a direction of an optical axis.

* * * * *